United States Patent Office 2,733,183
Patented Jan. 31, 1956

2,733,183
STORAGE-STABLE DIHYDROSTREPTOMYCIN SULFATE SOLUTION

Herman Sokol, Hasbrouck Heights, N. J., and Robert P. Popino, Brooklyn, N. Y., assignors, by mesne assignments, to American Cyanamid Company, New York, N. Y., a corporation of Maine No Drawing. Application April 11, 1951,
Serial No. 220,524

3 Claims. (Cl. 167—65)

The present invention relates to pharmaceutical preparations for parenteral use, relating more particularly to an aqueous solution containing as its sole therapeutically active substance dihydrostreptomycin sulfate treated to remove substantially all impurities, foreign substances or diluents, making such preparations not only especially effective for their intended purposes but also providing a preparation of this nature which remains in a stable condition without significant diminution of its desirable properties over a prolonged period of time at room temperatures.

Prior to the present invention, it was necessary in order to provide an aqueous solution of dihydrostreptomycin sulfate for parenteral use to initially place the dihydrostreptomycin sulfate in the vial or ampule in the form of a powder. The doctor, nurse, or other ultimate user of the solution was obliged to procure sterile pyrogen-free water and to dissolve the dihydrostreptomycin powder in order to provide the necessary aqueous solution.

The inconvenience, disadvantages and dangers of this procedure are evident. In the first place, the doctors have experienced considerable difficulty in having available sterile pyrogen-free water at the time and place that the administration of the aqueous solution of dihydrostreptomycin was indicated.

Also, the doctors have had difficulty in dissolving the powdered dihydrostreptomycin without inadvertently introducing pyrogens, bacteria or foreign substances which could easily cause disturbing or dangerous reactions in the patient thus delaying his recovery or possibly making further use of dihydrostreptomycin inadvisable.

Furthermore, the doctors have been greatly inconvenienced in preparing the solution of dihydrostreptomycin and in being careful to provide the desired concentration or dose. Despite care on the part of the doctor or nurse, errors in this respect have necessarily occurred since it was not possible in many instances to check the preparation of the solution or to provide the proper equipment and to use the proper methods.

Heretofore, attempts to prepare in advance and to market for the doctor's use an aqueous solution of dihydrostreptomycin have been unsuccessful principally because such solutions have been unstable. In particular, their color darkened on standing, their activity decreased appreciably in a relatively short period of time and in some instances solid substances or gummy masses developed in the vial or ampule. Naturally, such solutions could not be prepared in advance and stocked or distributed for use.

Accordingly, it is an object of the present invention to provide a stable, aqueous solution of dihydrostreptomycin which solution is stable over a long period of time without loss or significant change in its desirable physical properties. For instance, solutions made in accordance with the present invention do not darken on standing, maintain their activity for at least eighteen months at room temperatures, remain sterile, remain pyrogen-free, and do not develop toxicity or histamine-like substances.

The stable solutions of the present invention are, of course, a great convenience to the doctor as well as assuring him of a steady supply of an aqueous solution of dihydrostreptomycin which is subject to careful control in its preparation and which therefore, is almost entirely free from errors in concentration or doses. More importantly, the doctor is freed from the responsibility of preparing the solution which is pyrogen-free and otherwise sterile and proper for parenteral use.

In order to provide an aqueous solution of dihydrostreptomycin sulfate embodying the present invention, sterile pyrogen-free water is required. While it is often difficult for a doctor to secure water of this character, it can be provided in quantity by a pharmaceutical manufacturer by means well-known in the industry.

Dissolved in this sterile pyrogen-free water is sufficient dihydrostreptomycin sulfate to provide a concentration of 100,000 to 500,000 micrograms per milliliter of solution. It is especially important that the dihydrostreptomycin sulfate so dissolved be highly purified and in this connection, the solid dihydrostreptomycin sulfate used for this purpose should contain from 725 to 800 micrograms of dihydrostreptomycin sulfate (calculated as the free base) per milligram of solid dihydrostreptomycin-containing material. Eight hundred micrograms of dihydrosterptomycin sulfate per milligram is the theoretical purity; that is, dihydrostreptomycin sulfate containing 800 micrograms per milligram would contain absolutely no impurities or inert substances of any kind whatsoever.

While dihydrostreptomycin sulfate produced by various recovery and purifying methods is satisfactorily pure for present purposes, it is recommended that carefully recovered and purified crystalline dihydrostreptomycin sulfate be utilized. Crystalline material when thoroughly washed with organic solvents and if carefully filtered off and handled has a purity of very nearly 800 micrograms per milligram. However, some amorphous material is satisfactory. But, most amorphous dihydrostreptomycin sulfate as well as some crystalline material which is not recovered or purified properly is not sufficiently pure to provide the desired stable aqueous solutions of the present invention.

Preservatives may be added to the solution containing the purified dihydrostreptomycin sulfate if desired. If such preservatives are used, it is recommended that phenol, various esters of parahydroxybenzoic acid or chlorobutanol be employed for this purpose. It is recommended that a concentration of 0.25 to 0.5% of phenol be employed if phenol is used, and that a mixture consisting of not more than 0.25 of the methyl ester together with not more than 0.05% of the propyl ester of parahydroxybenzoic acid be used if the latter is employed as the preservative.

In order to illustrate the present invention more specifically, Tables I and II presented hereinafter have been prepared in order to compile and set forth distinctly the significant data resulting from the preparation of many embodiments of the invention.

All of the embodiments of the invention referred to in both Tables I and II were tested in various respects in addition to the tests expressly mentioned in the tables. These tests disclose that all of these embodiments remain free of pyrogens for the period of the tests. They did not develop toxicity during this period and did not develop any histamine-like substances. Also, they remain sterile and their pH did not change significantly.

The purity of the dihydrostreptomycin sulfate contained in all of the solutions referred to in both Tables I and II was from 725 to 800 micrograms of dihydrostreptomycin sulfate (calculated as a free base) per milligram of solid material dissolved to provide the solution.

In Table I, all of the solutions had a potency of 250,000 micrograms of dihydrostreptomycin sulfate per milliliter of solution and each vial contained one million micrograms of dihydrostreptomycin sulfate.

The APHA color test referred to in both Tables I and II is a means for accurately determining color changes if any in the solution. As carried out for present purposes, one million micrograms of dihydrostreptomycin sulfate in solution is diluted up to 50 cc. with distilled water and is compared in a 50 cc. Nessler tube against various standard solutions of platinum cobalt. The numbers referred to in Tables I and II identify particular standard solutions of this kind. Such solutions may be prepared in accordance with the procedure set forth on pages 14 and 15 of "Standard Methods for the Examination of Water and Sewage," ninth edition, published by American Public Health Association, 1790 Broadway, New York 19, New York.

TABLE I

*Stability data on solutions of amorphous dihydrostreptomycin sulfate stored at room temperature without preservative*

| Sample No. | Original Assay, mcg./vial | Test Results, Six Months Assay | Test Results, Eighteen Months | |
|---|---|---|---|---|
| | | | Assay | APHA Color Value |
| 1 | 997,000 | 1,004,000 | 1,013,000 | |
| 2 | 989,000 | 1,007,000 | 1,060,000 | 20 |
| 3 | 1,007,000 | 998,000 | 1,020,000 | 20 |
| 4 | 967,000 | 994,000 | 1,000,000 | 25 |
| 5 | 1,036,000 | 986,000 | 965,000 | 15 |
| 6 | 1,032,000 | 973,000 | 990,000 | |
| 7 | 972,000 | 956,000 | 967,000 | 15 |
| 8 | 972,000 | 1,021,000 | 1,020,000 | 5 |

TABLE II

*Stability of solutions of dihydrostreptomycin sulfate with and without preservatives stored at 25° C. and 37° C.*

| Nature of Material | Original Assay mcg./ml. | Original APHA Color | Test Results | | | | | | | |
|---|---|---|---|---|---|---|---|---|---|---|
| | | | Six Months | | | | Twelve Months | | | |
| | | | Assay, mcg./ml* | | APHA Color | | Assay, mcg./ml* | | APHA Color | |
| | | | 25° C. | 37° C. | 25° C. | 37° C. | 25° C. | 37° C. | 25° C. | 37° C. |
| Crystalline Dihydrostreptomycin sulfate without preservative. | 243,000 | 15 | 256 | 265 | 25 | 60 | 246 | 250 | 30 | 140 |
| Do | 470,000 | 10 | 516 | 519 | 25 | 90 | 467 | 492 | 25 | 100 |
| Do | 249,000 | 15 | 250 | 264 | 35 | 60 | 248 | 234 | 40 | 90 |
| Do | 464,000 | 15 | 497 | 512 | 25 | 60 | 496 | 464 | 30 | 90 |
| Crystalline Dihydrostreptomycin sulfate with 0.25% phenol | 239,000 | 15 | 259 | 272 | 30 | 70 | 241 | 246 | 40 | 120 |
| Do | 503,000 | 15 | 519 | 510 | 25 | 70 | 469 | 526 | 30 | 180 |
| Do | 222,000 | 10 | 239 | 241 | 30 | 60 | 213 | 220 | 35 | 100 |
| Do | 498,000 | 15 | 513 | 519 | 30 | 70 | 494 | 498 | 45 | 100 |
| Crystalline Dihydrostreptomycin sulfate with 0.18% methyl parahydroxybenzoate and 0.02% propylparahydroxybenzoate | 232,000 | 10 | 257 | 257 | 25 | 90 | 248 | 247 | 30 | 100 |
| Do | 242,000 | 15 | 279 | 275 | 35 | 70 | 235 | 252 | 45 | 90 |

*Mcgs./ml. are expressed in thousands.

Various changes and modifications may be made in carrying out this invention without departing from the spirit and scope thereof. Insofar as these changes and modifications are within the scope of the appended claims, they are to be considered as part of this invention.

We claim:

1. A stable pharmaceutical preparation for parenteral use consisting of an aqueous medium having dissolved therein crystalline dihydrostreptomycin sulfate and a minor but effective amount of a preserving agent selected from the group consisting of phenol and ester of para hydroxybenzoic acid, said crystalline dihydrostreptomycin sulfate being the sole therapeutically active substance in said preparation and being substantially entirely free of impurities, whereby the effectiveness and physical properties of said preparation are not materially affected by prolonged storage at room temperature.

2. A stable pharmaceutical preparation for parenteral use consisting of sterile pyrogen-free distilled water having dissolved therein 0.25 to 0.5% of phenol as a preservative and crystalline dihydrostreptomycin sulfate treated to remove substantially all impurities and foreign materials therefrom, said crystalline dihydrostreptomycin sulfate being the sole therapeutically active substance in said preparation, whereby the effectiveness and physical properties of said preparation are not materially affected by storage at temperatures of 37° C. or less for a period of at least eighteen months.

3. A stable pharmaceutical preparation for parenteral use consisting of sterile pyrogen-free distilled water having dissolved therein not more than 0.25% of the methyl ester and not more than 0.05% of the propyl ester of para hydroxybenzoic acid and also having dissolved therein crystalline dihydrostreptomycin sulfate treated to remove substantially all impurities and foreign materials therefrom, said crystalline dihydrostreptomycin sulfate being the sole therapeutically active substance in said preparation, whereby the effectiveness and physical properties of said preparation are not materially affected by storage at temperatures of 37° C. or less for a period of at least eighteen months.

References Cited in the file of this patent

UNITED STATES PATENTS

| 2,472,640 | Wilcox | June 7, 1949 |
| 2,498,574 | Peck | Feb. 21, 1950 |
| 2,522,858 | Carboni et al. | Sept. 19, 1950 |
| 2,552,547 | Fried et al. | May 15, 1951 |

OTHER REFERENCES

U. S. Dispensatory, 24th ed., 1947, pp. 710, entry "Methylparaben."

Report, "Symposium on Modern Methods of Preservation of Medicinal Substances and Pharmaceutical Preparations." Quarterly Journal of Pharmacy and Pharmacology, vol. 21, 1948, pp. 451 to 469.

Science, May 20, 1949, vol. 109, pp. 515, 516, Solomons et al. and Wolf et al.

Silcox: "Production of Streptomycin," Chem. & Eng. News, October 25, 1946, pp. 2762–2764, esp. at p. 2764, last paragraph of article.

Donovich: J. Bact., v. 53 (1947), pp. 205–11.

Peck: J. A. C. S., v. 68 (1946), pp. 1390–91.